Figure 7:
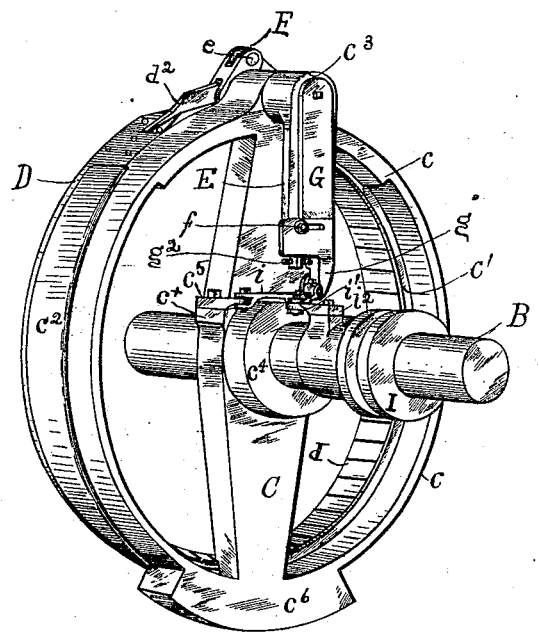

(No Model.)  
2 Sheets—Sheet 1.
W. OESTERLEIN.
CLUTCH.
No. 515,091.  Patented Feb. 20, 1894.
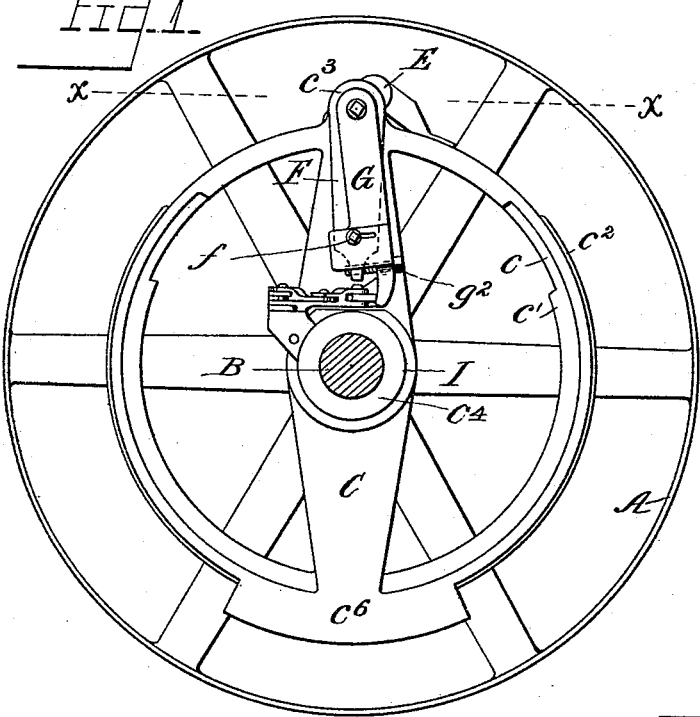
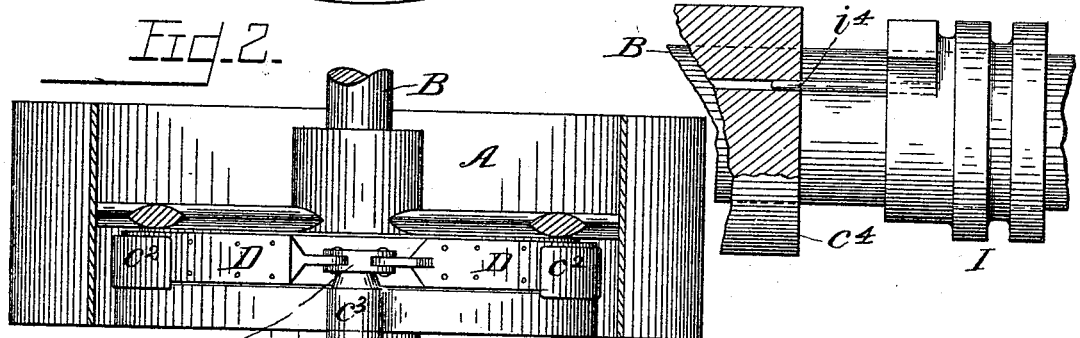
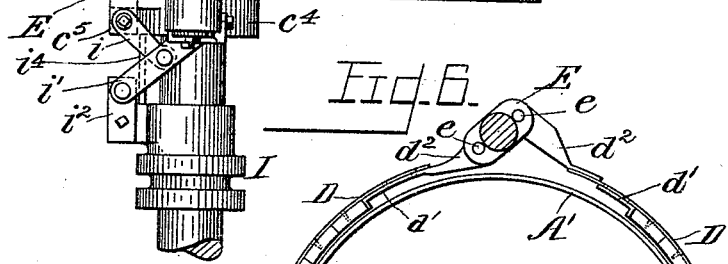
Witnesses:
W. C. Jirdinston.
W. F. Murray.
Inventor:
Wilhelm Oesterlein
Geo. F. Murray
his Attorney.

(No Model.)

W. OESTERLEIN.
CLUTCH.

No. 515,091.

2 Sheets—Sheet 2.

Patented Feb. 20, 1894.

Witnesses
Ralph C. Emyart
M. L. Murray

Inventor
Wilhelm Oesterlein
By Geo. J. Murray
Atty

UNITED STATES PATENT OFFICE.

WILHELM OESTERLEIN, OF CINCINNATI, OHIO.

CLUTCH.

SPECIFICATION forming part of Letters Patent No. 515,091, dated February 20, 1894.

Application filed June 20, 1892. Renewed August 8, 1893. Serial No. 482,668. (No model.)

*To all whom it may concern:*

Be it known that I, WILHELM OESTERLEIN, a citizen of the United States, and a resident of Cincinnati, in the county of Hamilton and State of Ohio, have invented certain new and useful Improvements in Friction-Clutches, of which the following is a specification.

My invention relates to friction clutches for coupling a driving wheel to its shaft and is an improvement upon the clutch shown in my Patent No. 378,803, dated February 28, 1888.

Its object is to provide a more positive and reliable means to couple and uncouple the friction, insure a more steady even movement and greater durability.

The invention will be first fully described in connection with the accompanying drawings and then particularly referred to and pointed out in the claims.

In the drawings in which like parts are indicated by similar reference letters wherever they occur throughout the various views: Figure 1. is a side elevation of the clutch and a pulley with which it is to be employed. Fig. 2 is a transverse sectional view taken through the line $x.\,x.$ of the pulley rim and arms Fig. 1. showing the clutch and its actuating mechanism in elevation. Fig. 3. is a detail plan view upon an enlarged scale of the inner end of the adjustable arm for regulating the tension of the friction band, and compensating for the wear of the friction surfaces, showing part of the link and the stud by which the arm is coupled to the sliding collar. Fig. 4. is a front elevation of the parts shown in Fig. 3. Fig. 5. is a view upon an enlarged scale, in elevation of the shaft and sliding collar, and the hub of the clutch member shown in section. Fig. 6. is an enlarged view in edge elevation of the pulley flange, and the friction band. Fig. 7 is a perspective view of the cross head and its attachments.

The pulley A, having the flange A′ projecting from its arms and loosely journaled upon the shaft B, is the same as in my said former patent. The crosshead C is cast with a rim $c$ of larger diameter than the flange A′. It has a flange $c'$ which projects inward in front of the edge of the flange A′, and a flange $c^2$ which overlaps the flange A′ leaving a space between for the friction band D. The rim $c$ has upon its periphery a perforated boss $c^3$ in which is journaled the crosshead E, which is preferably cast in one piece with its shaft, which shaft projects through the boss $c^3$, and upon its outer end is secured an arm F, which extends toward the axis at a slight angle to a radial line to counterpoise the heavier part of the hub upon the opposite side. Upon the extended end of the crosshead shaft in front of the fixed arm F is journaled a depending arm G, one end of which projects down to near the flattened portion of the hub $c^4$ of the cross head C, and has a lug $g'$ projecting from its rear to receive the pin $h$ of a perforated stud head H to which the link which couples the arm G to the shifting collar I is pivoted. The arm G is transversely slotted to pass the shank of a cap-screw $f$, which is tapped into the arm F. for the purpose of locking the arms F. and G. as one piece. A similar cap nut $g^2$ passes through the extension $g$, of the arm G. and is tapped through a lug projecting down from the arm F. The purpose of these adjusting screws is to regulate the tension of the friction band upon the flange A′ and also to compensate for wear.

The friction band is composed of a steel band D lined interiorly with sectoral wooden blocks $d$ which are secured to the band by screws and firmly braced edge to edge, when the blocks are compressed upon the flange A′ by angle plates $d'$ which are securely riveted to the ends of the friction band. These angle plates may be formed integral with the clips $d^2$, which are secured between the bifurcated ends of the crosshead E by journal pins $e$; or they may be made separately and both angle plates and clips be secured to the ends of the band D. In Fig. 6 I have shown the alternate modes of attachment applied to the opposite ends of the band. And for the smaller size of clutches I prefer to so apply them. The blocks $d$ are preferably formed to present the end grain of the wood to the periphery of the flange A′. I have found that the wood lining so arranged makes an excellent friction surface, not liable to heat or deteriorate in use as leather or other elastic lining. In practice I prefer to use hard maple or beech, but the softer woods or wood fiber will answer the purpose. As the principal strain in use is sustained by the angle plates $d'$, the screws which pass through the band D into the blocks may be small, their principal office being to hold the sectoral blocks $d$ in place upon the band D when the clutch is released.

The band D is positively forced upon the flange A' and positively released or forced from it by the means I will now describe: The hub $c^4$ of the crosshead C has a rabbeted projection $c$ upon one side to seat the block $c^5$ upon which is pivoted the short link $i$. The opposite end of this link is coupled by a journal pin centrally to the link $i'$. The link $i'$ is pivoted at one end upon a block $i^2$ seated on a projection from the sliding collar I and the opposite end is coupled by a pin $i^3$ to the stud block H.

The sliding collar I. is coupled to revolve with the cross-head C. by a pin $i'$, which is secured in the inner edge of the collar and traverses a perforation in the adjacent edge of the hub $c^4$. The pin $i^4$ accomplishes the same purpose as a spline or feather coupling, for the shaft B. and the collar I, but is less expensive and reduces friction.

To perfectly balance my clutch I cast with the cross arm C. a counter weight $c^6$, the weight of which is equal to the attachments upon the cross arm diametrically opposite, and by adjusting the fixed arm F. at an angle to the longitudinal, and diametrical center of the cross arm C, I counterpoise the heavier part of the hub $c^4$ with its fulcrum attachments.

The end $g$ of the arm G, and the edge of the stud-head H, which abuts against it, are formed concentric with the axis of the pin $h$ so that when the arm G, is swung in either direction to compress the friction band upon the flange A', or release it the parts will keep in frictional contact, and relieve the pin $h$, from undue strain.

The operation of my device is as follows: The clutch being in the uncoupled position shown in Figs. 2 and 5, the collar I is forced in the direction of the hub $c^4$ by a forked lever (not shown) in the usual manner, the arms F,—G, are swung to one side, rocking the crosshead E, and compressing the friction band D. $d$. upon the flange A', of the loose pulley A. It will be seen that by means of the compound levers $i$—$i'$ the band will be gradually tightened and the pulley D be started gradually. The retraction of the collar I, forces the friction band away from the flange A'. I have found in practice that the friction band will adhere to the friction flange A', for some little time after the power which compresses the band is released, and cause a slipping and consequently wearing action between the surfaces; by positively setting and positively releasing the band, this objection is overcome. To adjust the stroke of the crosshead E to draw the band with greater or less force upon the flange A' or to compensate for the wear of the wooden blocks $d$, it is only necessary to loosen the cap nut $f$, adjust the relations of the arms F, G, by means of the cap nut $g^2$ and again tighten up the nut $f$, thus the clutch may be used until the blocks are worn out, and when worn so much as to be ineffective they may be readily replaced by new ones.

What I claim is—

1. The combination of the loose pulley A having flange A' the fixed crosshead C, the rocking crosshead E, carried by the fixed crosshead, the friction band surrounding the flange A' and connected to the crosshead E, and a crank arm fixed upon the shaft of said crosshead and extending near the hub of the fixed crosshead, the sliding collar I and levers connecting said collar and the arm of the crosshead E, for the purpose of compressing and releasing the friction band substantially as shown and described.

2. The combination substantially as specified of the loose pulley having an interiorly arranged friction flange, a friction band arranged to be tightened upon said flange, a crosshead fixed alongside of said pulley, and carrying a rocking crosshead, to which the ends of the band are connected, a dependent arm secured on the shaft of the cross head, the sliding collar and the links connecting the sliding collar and dependent arm for rocking said crosshead to tighten the band upon the flange and release it therefrom.

3. The combination of the interiorly flanged loose pulley, the crosshead C, having rim $c$ interior flange $c'$ overlapping flange $c^2$, and the boss $c^3$, the rocking crosshead E journaled in boss $c^3$, the friction band D having clips $d^2$ secured to its ends, the pins $e$ for coupling said clips to crosshead E, the fixed arm F and adjustable arm G, the sliding collar, the link $i'$, pivoted upon the hub $c$ and centrally to the link $i$ said link $i'$ being pivoted upon the projection from the sliding collar I and coupled to the depending arm substantially as shown and described.

4. The combination of the pulley A having flange A' the cross head C having rim $c$ and flanges $c'$, $c^2$, and boss $c^3$ and hub $c^4$, perforated to receive the rod $i^4$, the sliding collar having rod $i^4$ to slide in the hub, the rocking crosshead E, having shaft journaled in boss $c^3$, the friction band having its ends connected to said rocking crosshead the arms F, G, adjustably secured together, said arm F being secured upon the shaft of the rocking crosshead, the link connecting the sliding collar and the arm G, and the link fulcrumed upon the hub $c^4$ and centrally connected to the link which connects the collar and arm G substantially as shown and described.

5. A band tightening mechanism for friction clutches of the character described composed of the fixed crosshead and its hub, the rocking crosshead, the depending arms for rocking said crosshead extending inward to near the hub, the stud H, pivoted in a lug of the depending arm, and bearing against the part g, the sliding collar for a shifting lever, the link connecting the sliding collar and the pivoted stud, and the link pivoted upon the hub of the fixed crosshead, and connected centrally to the link which connects the said stud H and collar, combined and arranged substantially as and for the purpose set forth.

WILHELM OESTERLEIN.

Witnesses:
W. C. JIRDINSTON,
GEO. J. MURRAY.